Figure 1:
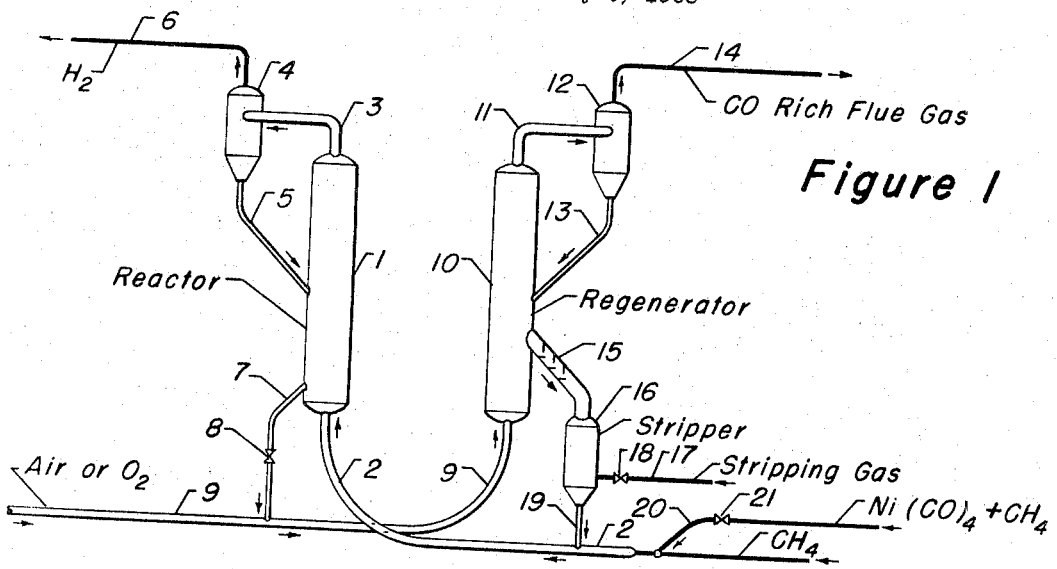

April 18, 1967  D. E. McCARTNEY ET AL  3,314,761
HYDROGEN PRODUCING SYSTEM
Filed July 5, 1963

INVENTORS:
Daniel E. McCartney
Henry A. Hauser
BY: James R. Hoatson Jr.
Philip T. Liggett
ATTORNEYS

United States Patent Office 3,314,761
Patented Apr. 18, 1967

3,314,761
HYDROGEN PRODUCING SYSTEM
Daniel E. McCartney, Mount Prospect, and Henry A. Hauser, Arlington Heights, Ill., assignors to Universal Oil Products Company, Des Plaines, Ill., a corporation of Delaware
Filed July 5, 1963, Ser. No. 293,068
6 Claims. (Cl. 23—212)

The present invention relates to an improved method for operating a continuous catalytic hydrogen producing system in a manner to maintain an active surface on the catalyst particles. More particularly, the invention is directed to means for introducing a metal carbonyl or a metal carbonyl-halogen compound into contact with the catalyst being used in the system and effecting the decomposition of such carbonyl compound to provide a fresh deposition of the activating metal or metal compound on the catalyst whereby activity thereof is maintained at a high level.

In carrying out a hydrogen producing system by the cracking or decomposing of methane or other hydrocarbon charge stream, it is preferable and substantially necessary from the commercial and economic aspects of the operation to maintain a continuously operating system capable of providing a high yield of hydrogen with a high degree of purity. Maintaining a high yield and purity seems to be directly related to maintaining a high activity level for the catalyst in the system. For example, in the operation of a fluidized catalytic hydrogen producing unit, wherein heated particles of a nickel-alumina catalyst are contacted by methane in the reaction zone to produce hydrogen and carbonized particles, and wherein the latter are subsequently contacted with air in a regeneration zone to effect the gasification and removal of the carbon, as well as to effect the reheating of the catalyst particles, it has been found that there is a gradual deactivation of the catalyst with an accompanying loss of equilibrium conversion. However, the same unit utilizing a fresh catalyst charge will provide substantially equilibrium conversion of methane to hydrogen and carbon, with such optimum conversion continuing until there is a gradual deactivation of the catalyst.

It is thus a principal object of the present invention to provide an improved processing operation which maintains a high level of catalyst activity in the unit.

It is also an object of the present invention to provide a modified operating procedure which is usable in a continuous manner to effect a fresh deposition of an activating metal component and resulting active metal oxide or metal on a particulated refractory oxide base.

A still further object of the present invention is to utilize an improved procedure for introducing a metal carbonyl or metal carbonyl halogen compound into contact with the catalyst being used in the system so as to maintain a resulting fresh metal oxide or metal deposition on the catalyst with the metal carbonyl or metal carbonyl halogen compound being formed in a separate integrated zone by the utilization of a portion of the catalyst in the circulating system and a portion of a carbon monoxide rich stream being produced from the regeneration zone of the system.

In a broad aspect the present invention provides a continuous catalytic conversion processing system wherein a hydrocarbon charge stream is decomposed in the presence of subdivided catalyst particles which are formed of a refractory oxide base having an active metal component complexed therewith to provide a hydrogen rich product stream, resulting carbon containing catalyst particles are withdrawn from the reaction zone and passed into a separate regenerating zone wherein carbon is gasified and removed at least in part from said particles, and resulting heated catalyst particles are returned to the reaction zone for contact with the charge stream, the improved method of operation maintaining a high catalyst activity and an equilibrium hydrogen yield, which comprises, introducing a metal carbonyl compound, the metal component of which corresponds to the active metal component of the refractory catalyst particles, into admixture with at least a part of the catalyst particles used in the system and effecting the coating and decomposition of such carbonyl compound thereon to in turn effect a fresh deposition of the active metal component on such particles for use in the system.

In an improved operation, the metal carbonyl may be mixed with a portion of the hydrocarbon charge stream, as, for example, methane, and introduced into admixture with a slip stream of catalyst particles from the regeneration zone such that the vaporized or atomized carbonyl compound becomes intimately mixed with the particles and in effect coats them. A subsequent higher decomposition temperature exposure, by virtue of heat carried by the particles themselves, or by subjecting the coated particles to an increased temperature, will effect the decomposition of the metal carbonyl compound on the surface of the catalyst particles to result in a deposition of the metallic form of the metal. Still further heating or subjecting of the particles to oxidation conditions, as, for example, the return of the coated particles to the regeneration zone will provide for the formation of the metal oxide on the refractory base oxide so that a freshly formed metal oxide on the catalyst particles may be returned to the reaction zone with the main stream of catalyst particles in the continuous system.

Generally, the catalyst particles used for the decomposition or cracking of methane, or other light hydrocarbon stream, to produce hydrogen will comprise a refractory oxide base particle with an iron group activating component. Thus, hydrogen producing decomposition catalysts will generally comprise iron oxide, nickel oxide, cobalt oxide, molybdenum oxide or mixtures of one or more of such oxides in combination with a refractory oxide base such as silica, alumina, or silica-alumina, alone or in combination with one or more additional refractory oxides including oxides of chromium, titanium, tungsten, platinum, palladium, thorium, barium, zirconium, magnesium, zinc. etc. It is not intended to limit the present improved method of operation to the use of any one particular type of catalyst compound even though iron and nickel are more generally preferred as activating metal components used to provide high temperature resistant refractory metal oxide at temperatures in the 1400° to 2000° F. temperature range or higher.

The present improved system of operation is particularly adapted for use with the continuously operating moving catalyst bed system or fluidized bed system with a fluidized transfer of particles. Fluidized operations are more widely used than strictly moving bed systems in present commercial operations since the finely divided catalyst particles are more more readily transferred from one zone to another by the reactant or regenerating gas streams. In addition, with the fluidized operation, it is easy to obtain intimate mixing between the reactant stream and the catalyst particles for high conversion efficiency. Moving bed systems necessarily utilize mechanical catalyst transporting equipment or employ gas lift and gravity flow arrangements to move the catalyst particles. However, it is not intended to restrict the present improved operation using the metal carbonyl compound introduction to enhance catalyst activity to any specific type of fluidized or moving bed operation.

The particular metal carbonyl compound which is utilized in any one system, of course, depends upon the active metal component on the catalyst of such system. In other words, with a unit utilizing a nickel oxidesilica-alumina catalyst, then the carbonyl compound will comprise nickel carbonyl while the unit utilizing an iron oxide activating component on a refractory base then the appropriate carbonyl compound will comprise iron pentacarbonyl. In addition, it is not intended to limit the additive compound to any one carbonyl compound, inasmuch as there may be certain of the nickel-halogen carbonyl compounds or iron-halogen carbonyl compounds utilized to admix with a slip stream of the catalyst and effect the deposition of the desired activating metal component on the catalyst.

Further, in an integrated operation, there may be a carbonyl producing zone effecting the preparation of a metal carbonyl compound which is to be utilized in a vaporous state to coat a slip stream of catalyst so as to effect the desired deposition of an active metal component on at least a portion of the catalyst particles. Such preparation of the carbonyl compound is accomplished by contacting a slip stream of catalyst particles withdrawn from the system with a portion of carbon monoxide rich gas stream being produced within the carbon gasification or regeneration zone or gas purification zone. The contacting of the metal oxide catalyst and the carbon monoxide stream will generally be effected at relatively low temperatures and low atmospheric pressure, although slightly higher temperatures and superatmospheric pressures may effectively be utilized in the carbonyl producing zone to effect a desired carbonyl production. For example, nickel carbonyl may be formed from a nickel deposition on a nickel oxide-silica-alumina catalyst by utilizing a rich carbon monoxide stream at atmospheric conditions or at a generally low temperature of the order of 200° F. and at 1000 p.s.i.g. or higher. The metal carbonyl from the carbonyl producing zone may be transferred to the inlet of a mixing zone or catalyst transfer line where there is a contacting of regenerated catalyst at controlled conditions to effect the successive steps of coating the catalyst particles and decomposing the carbonyl thereon to in turn form the fresh deposition of the desired metal. The catalyst which is withdrawn from the system and contacted with the carbon monoxide rich stream may be returned to the system in a substantially denuded state or discarded entirely from the system.

In still another modification there may be fresh nickel deposition and active catalyst formed by using carbon monoxide from the regeneration zone to remove nickel from used catalyst as nickel carbonyl and then subsequently redeposit nickel on the thus denuded catalyst. Such removal and redeposit steps may be carried out in a two stage type of operation or as substantially simultaneous steps.

Reference to the accompanying drawing and the following description thereof will serve to clarify the improved method of operation for maintaining a high catalyst activity in a hydrogen production system, as well as point out variations in operational procedure to provide an optimum type of processing unit.

FIGURE 1 of the drawing indicates diagrammatically a fluidized catalyst hydrogen producing system with means to introduce a metal carbonyl compound into contact with catalyst particles circulating in the system and effect maintenance of the catalyst activity.

Figure 2:
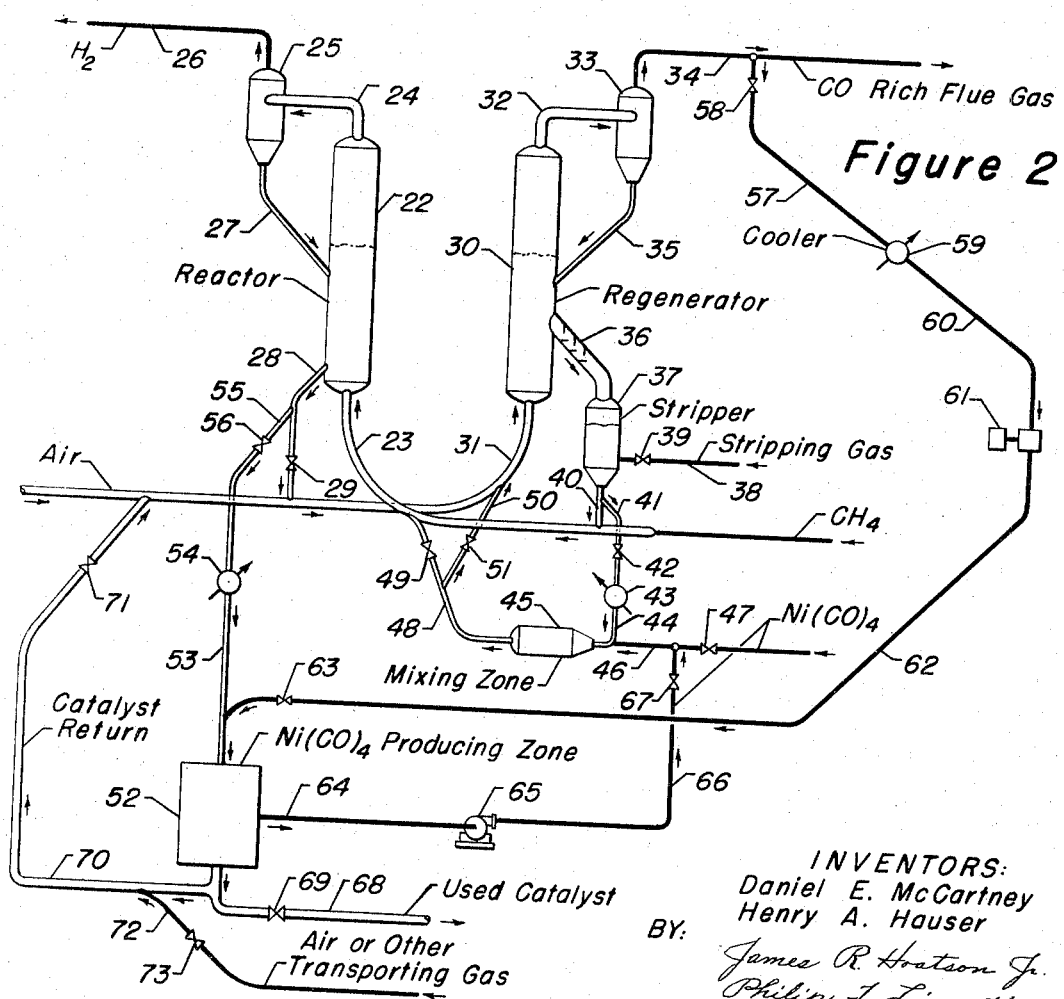

FIGURE 2 of the drawing also indicates diagrammatically a fluidized catalyst system for effecting the production of hydrogen by the decomposition of a hydrocarbon stream; however, in addition, there is shown integrated within the system means for effecting the formation of a metal carbonyl compound from the contact between a slip stream of catalyst and a carbon monoxide rich stream produced from the regeneration zone.

Referring now particularly to FIGURE 1 of the drawing, there is shown a reactor 1 adapted to receive heated catalyst particles and a charge stream from a riser line 2. The catalyst and charge stream effect a desired intermixing and contact within the interior of the reactor zone such that there is a decomposition of the charge stream, indicated herein as a methane stream, to produce a hydrogen rich product stream and carbonized catalyst particles. The hydrogen rich stream with entrained particles is passed from the upper end portion of the reactor zone 1 by way of line 3 and particle separator 4. The latter serves to recover entrained catalyst particles and return them to the unit by way of dip leg or standpipe 5 while the hydrogen rich product stream passes overhead by way of line 6. Carbon containing catalyst particles are continuously withdrawn from the lower portion of reactor 1 by way of line 7 and control valve 8, to be subsequently entrained in an air or free oxygen containing stream within line 9 for transfer into regeneration chamber 10.

The regenerator is generally maintained, in a preferred operation, under controlled oxygen content conditions to provide the gasification and removal of carbon from the catalyst particles to in turn effect the desired production of heat and reheating of catalyst particles as well as carbon removal to a desired lower carbon level. Again, the oxygen and carbonized catalyst contacting is indicated as being carried out in a fluidized bed within the regeneration zone such that a resulting carbon monoxide-carbon dioxide flue gas stream and entrained particles will pass overhead by way of line 11 to a separator 12. Collected particles from separator 12 are returned by way of line 13 to the fluidized bed in regenerator 10 while a carbon monoxide rich flue gas stream passes overhead by way of line 14. A continuous stream of heated catalyst particles having a lower carbon content are withdrawn from the regenerator by way of line 15 and stripping zone 16. In the latter there may be introduction of a suitable stripping gas such as hydrogen, methane of nitrogen, such that entrained and occluded carbon oxides are stripped from the particles prior to their reintroduction into the reaction zone. The stripping gas stream is indicated as being introduced by way of line 17 and valve 18. Preferably the stripping stream comprises a portion of the hydrogen product stream or other reducing gas such that the catalyst particles are not returned to the reaction zone in an oxidized state which may lead to the production of greater quantities of carbon oxides therein. The resulting stripped particles pass from stripper 16 by way of line 19 into the transfer line 2 which carries methane and heated particles into the conversion zone 1.

In accordance with the improved operation of the present invention there is an introduction of a metal carbonyl compound that is compatible with the activating metal component of the catalyst particles, whereby there is a deposition of fresh activating metal or metal oxide on such particles. Thus, there is indicated line 20, having control valve 21, providing for the introduction of the carbonyl compound into admixture with catalyst in line 2. In an illustrative example, FIGURE 1 indicates that nickel carbonyl in admixture with methane passes in a vaporized stream into line 2 such that there is a coating of at least a part of the particles passing from the regenerator to the reaction zone. Since the catalyst particles are at a high temperature which may be of the order of 1600° F. or higher, there will be a coating and a subsequent decomposition of the carbonyl compound onto the particles to provide a fresh nickel deposition for use in effecting further conversion of the charge stream in the downstream end portion of line 2 and within the reactor 1.

As set forth briefly hereinabove, a modification may be provided whereby the carbonyl compound intermixes with a slip stream of catalyst and such coated catalyst particles subsequently returned to the regeneration zone in order that there may be an oxidation of the fresh metal to the oxide state prior to its introduction into the reaction zone. The separate controlled mixing of the carbonyl stream of catalyst is also of advantage in that there may be a coating at a favorable temperature precluding decomposition of the carbonyl vapor and prior to reaching and coating the particles. Subsequent to effecting the coating step there may be a high decomposition temperature to provide the metal and then the oxidation of such metal coating to form the oxide. For example, nickel carbonyl having a boiling point of the order of 110° F. may be intermingled with methane at a temperature of the order of 200° F. at the time of the initial contact with the slip stream of catalyst particles. Subsequently the coated particles may be heated or introduced into a line or zone having the particles at a higher temperature of the order of 400° F. or more, such that there is a decomposition of the nickel carbonyl to produce occluded nickel on the particles. The nickel may in turn be oxidized in the presence of oxygen in the regeneration zone or in a separate oxidizing zone whereby there is a conversion to the nickel oxide state on the catalyst particles prior to their return to the reaction zone. Similarly, with an iron oxide-silica-alumina catalyst there may be the introduction of iron pentacarbonyl with methane, or other diluent stream, into contact with a slip stream of catalyst particles at a temperature generally below about 200° F. such that there is no decomposition of the carbonyl compound. Then subsequent to the coating of the particles there may be a subjecting of the particles to a higher temperature level, say of the order of 400° F., or higher, whereby to effect the decomposition of the compound to effect the occlusion of iron on the particles.

Referring now specifically to FIGURE 2 of the drawing, there is shown diagrammatically a fluidized system having a reactor 22 adapted to receieve a methane, or other hydrocarbon charge stream, and heated catalyst particles by way of line 23 such that there may be a decomposition of the charge stream to produce a hydrogen rich stream and carbonized catalyst particles. A hydrogen rich stream passes from the top of reactor 22 by way of line 24, separator 25 and outlet line 26. Recovered catalyst particles are transferred from separator 25 by way of line 27 back to the reaction zone 22. Carbonized catalyst particles are also continuously withdrawn from reactor 22 by way of standpipe 28 and control valve 29 for transfer into regenerator zone 30 by way of line 31. Air or other free oxygen containing stream is introduced into line 31 to effect the transfer of particles from line 28 and in turn effect the gasification of the carbon on the particles such that in regenerator 30 there is a controlled production of carbon monoxide and carbon dioxide and a reheating of particles to a desired optimum level to maintain a heat balance in the unit. The resulting carbon monoxide-carbon dioxide flue gas stream passes from the upper end of the regenerator 30 by way of line 32, particle separator 33 and outlet line 34. Recovered entrained catalyst particles from separator 33 are returned back to the bed in the regenerator by way of line 35. As described in connection with FIGURE 1, heated catalyst particles with a reduced carbon are continuously withdrawn from the regeneration zone of the unit, and, in this instance, by way of line 36 and stripper 37 such that occluded carbon oxides may be removed from the particles prior to their return to the reaction zone. Hydrogen, methane or other stripping-reducing gas is introduced to the lower end of the stripper by way of line 38 and valve 39. Thus, heated and stripped particles descend through standpipe 40 to reenter line 23 and effect the contact of the methane or other hydrocarbon charge stream entering reactor 22.

In accordance with a preferred method of operation, a slip stream of catalyst particles is withdrawn from standpipe 40 by way of line 41, having valve 42, to enter a cooler 43, line 44 and mixing zone 45. In the latter, a metal carbonyl compound, illustrated in the embodiment of the drawing as nickel carbonyl, is introduced by way of line 46 and valve 47 into admixture with the catalyst particles in zone 45 at a temperature level generally below about 200° F. The catalyst particles with a carbonyl coating from mixing zone 45 may then be transferred by way of line 48 and valve 49 into line 23 and the main stream of catalyst particles wherein the higher temperature conditions effect the decomposition of the carbonyl compound to form finely divided metallic nickel to enhance methane decomposition into hydrogen and coke in the reactor 22.

In an alternative arrangement, the coated particles from line 48 may be passed by way of line 50 and valve 51 into the transfer line 31 carrying carbon containing catalyst particles from the reactor 22 into regenerator 30. In this latter flow, the metallic coating may be subjected to oxidizing conditions so that resulting freshly deposited metal oxide is added to a portion of the catalyst particles subsequently passing from the regenerator 30 back into reactor 22.

In an integrated operation, there is a formation of metal carbonyl compound in a producing zone 52 which receives catalyst particles by way of line 53, cooler 54 and line 55 with control valve 56. The latter in turn is connected with line 28 to obtain a catalyst supply from the circulating system. Zone 52 also receives carbon monoxide from the carbon monoxide rich flue gas stream in line 34 by way of line 57, having valve 58, the cooler 59, line 60, compressor 61 and line 62 with control valve 63. As hereinbefore pointed out, the metal carbonyl, such as for example a nickel-carbonyl may be produced by contacting a nickel containing material such as the catalyst used in a hydrogen producing system having of the order of 5 to 10 percent nickel by weight of the composite. The formation is generally carried out at a low temperature below about 200° F. and at atmospheric or superatmospheric pressure favoring the optimum formation of the carbonyl. Thus, nickel carbonyl from zone 52 at a temperature of from ambient conditions to say of the order of 200° F. may be withdrawn by way of line 64, pump 65 and line 66 with valve 67, for introduction into the mixing zone 45. The nickel carbonyl produced in zone 52 provides at least a portion of the fresh nickel carbonyl requirements for the system, such that there may be a reduction, or elimination, of that portion of the carbonyl compound being introduced by way of control valve 47 in line 46.

The catalyst contacted with the carbon monoxide in zone 52 may be continuously discharged by way of line 68 and valve 69 or may be reintroduced into the system by way of transfer line 70 and valve 71 connective with transfer line 31. Air or other transporting gas stream communicates with transfer line 70 through line 72 having control valve 73.

Although the specific embodiments and drawings have described the use of a nickel carbonyl compound in effecting the coating of nickel oxide refractory base catalyst particles, it is again pointed out that efficient hydrogen producing units may utilize iron, cobalt, molybdenum or other active metal components to assist in the catalytic decomposition of the hydrocarbon charge stream for hydrogen production. The particular metal carbonyl compound then being supplied and introduced to the system will comprise a metal to correspond to and be compatible with the particular activating metal of the catalyst composite used in such system. Generally, the admixture of carbonyl onto the catalyst or into the slip stream of catalyst particles from the unit is in an amount such as to add a fresh deposition of the active component of about 0.1% to about 1% of nickel by weight of the catalyst composite, although higher quantities may be added.

The amount of active metal component on the catalyst for the hydrocarbon decomposition reaction may vary widely, depending upon the type of catalyst, however, the metal component will generally vary from 2% to 20% and more frequently will be of the order of 5% to 10% by weight of the catalyst composite.

The amount of catalyst coated with carbonyl, or the amount of metal carbonyl compound introduced into the hydrogen producing system during its operation will also vary with different forms of catalyst and must be regulated to determine optimum quantities. In other words, the amount of nickel carbonyl used to coat a part of a nickel-alumina catalyst, of 5% nickel content, will be different from that utilized to maintain activation of a nickel-silica-alumina catalyst having 10% nickel content. The quantity of nickel-chlorine-carbonyl may differ from the amount of nickel-fluorine-carbonyl needed to maintain a desired conversion level. Similarly the amount of iron pentacarbonyl used with an iron-alumina may vary from that amount of nickel carbonyl used with a nickel containing catalyst. Thus, it is not intended to limit the use of any one type improved method of operation to the use of any one type of carbonyl compound and any predetermined quantity for introduction into hydrogen producing systems in general.

We claim as our invention:

1. In a continuous catalytic conversion process system wherein a hydrocarbon charge stream is decomposed in a reaction zone in the presence of subdivided catalyst particles which are formed of a refractory oxide base having a deposit of an active metal component selected from the group consisting of nickel, iron, cobalt and molybdenum to provide a hydrogen rich product stream, resulting carbon containing catalyst particles are withdrawn from the reaction zone and passed into a separate regenerating zone wherein carbon is gasified and removed at least in part from said particles, and resulting heated catalyst particles are returned to the reaction zone for contact with the charge stream, the improved method of operation for maintaining a high catalyst activity and a high hydrogen yield, which comprises, introducing a metal carbonyl compound, the metal component of which corresponds to the active metal component of the refractory catalyst particles, into admixture with at least a part of the catalyst particles passing from one of said zones to the other and while at a temperature above about 400° F. to decompose such carbonyl compound thereon and form a fresh deposition of the active metal component on such particles for use in the system.

2. The process of claim 1 further characterized in that said system has nickel-containing refractory oxide base catalyst particles and a nickel carbonyl compound is introduced into admixture with said particles passing from one of the zones to the other.

3. The process of claim 1 further characterized in that said system has iron containing refractory oxide base catalyst particles and an iron carbonyl compound is introduced into admixture with said particles passing from one of the zones to the other.

4. In a continuous catalytic conversion process system wherein a hydrocarbon charge stream is decomposed in a reaction zone in the presence of subdivided catalyst particles which are formed of a refractory oxide base having a deposit of an active metal component selected from the group consisting of nickel, iron, cobalt and molybdenum to provide a hydrogen rich product stream, resulting carbon containing catalyst particles are withdrawn from the reaction zone and passed into a regenerating zone wherein carbon is gasified and removed at least in part from said particles, and resulting heated catalyst particles are returned to the reaction zone for contact with the charge stream, the improved method of operation for maintaining a high catalyst activity and a high hydrogen yield, which comprises, withdrawing a slip stream of heated regenerated catalyst particles from the regeneration zone and contacting them while at a temperature above about 400° F. with a metal carbonyl compound corresponding to the active metal component of the catalyst particles of said system to decompose said carbonyl compound and deposit its active metal component on such particles, subsequently returning the catalyst particles with occluded metal back into the regeneration zone and effecting the oxidation and heating of such fresh metal deposition on such particles prior to their transfer to the reaction zone.

5. The method of claim 4 further characterized in that the metal of said carbonyl is nickel.

6. A method for effecting the catalytic decomposition of a hydrocarbon stream to produce a hydrogen rich stream and a carbon monoxide rich stream which comprises, contacting heated subdivided catalyst particles formed of a refractory oxide base and a metal activating component selected from the group consisting of nickel, iron, cobalt and molybdenum at a temperature level effective for the decomposition of said charge stream to produce a hydrogen rich product stream in a reaction zone, discharging the resulting hydrogen rich stream from such zone, withdrawing carbon containing catalyst particles from the reaction zone and passing them to a regeneration zone and contacting them therein with a regenerating stream containing free oxygen to effect the controlled gasification of carbon on such particles, discharging a carbon monoxide rich flue gas stream from the regeneration zone, withdrawing catalyst particles with reduced carbon level in a reheated state and passing them to the reaction zone for contact with said hydrocarbon charge stream, simultaneously withdrawing a separate slip stream of said particles from the regeneration zone and contacting them while at a temperature above about 400° F. with a metal carbonyl compound, the metal component thereof corresponding to the active metal component of the catalyst particles, to decompose the carbonyl compound in contact with the particles and deposit a small amount of the activating metal on such particles, returning the thus coated particles to the regeneration zone to oxidize the deposited metal on such particles prior to their withdrawal from the regeneration zone and use in the reaction zone, simultaneously withdrawing a slip stream of catalyst particles from the reaction zone and contacting them with a portion of the carbon monoxide rich stream being discharged from the regeneration zone at a temperature below about 200° F. to produce a metal carbonyl product stream, and passing such metal carbonyl product stream into contact with the slip stream of catalyst particles being withdrawn from said regeneration zone as aforesaid to provide the fresh deposition of the active metal component on said catalyst particles being returned to the conversion system in an amount to maintain a level of activity therein.

References Cited by the Examiner

UNITED STATES PATENTS

| 3,129,060 | 4/1964 | Pohlenz | 23—212 |
| 3,197,284 | 7/1965 | Hoekstra | 23—212 |
| 3,216,801 | 11/1965 | Hoekstra | 23—212 |

FOREIGN PATENTS 363,735 12/1931 Great Britain.

OSCAR R. VERTIZ, *Primary Examiner.*

B. H. LEVENSON, *Assistant Examiner.*

MILTON WEISSMAN, *Examiner.*